US012631069B1

(12) United States Patent
Fraga

(10) Patent No.: US 12,631,069 B1
(45) Date of Patent: May 19, 2026

(54) ATTACHABLE LADDER STABILITY DEVICE

(71) Applicant: Juan Carlos Fraga, N. Fort Myers, FL (US)

(72) Inventor: Juan Carlos Fraga, N. Fort Myers, FL (US)

( * ) Notice: Subject to any disclaimer, the term of this patent is extended or adjusted under 35 U.S.C. 154(b) by 477 days.

(21) Appl. No.: 18/315,241

(22) Filed: May 10, 2023

(51) Int. Cl.
*E06C 7/48* (2006.01)

(52) U.S. Cl.
CPC .................................... *E06C 7/488* (2013.01)

(58) Field of Classification Search
CPC .................................... E06C 7/48; E04G 3/26
See application file for complete search history.

(56) References Cited

U.S. PATENT DOCUMENTS

| | | | | | |
|---|---|---|---|---|---|
| 1,393,922 | A * | 10/1921 | Taylor | E06C 7/48 | 248/238 |
| 2,592,006 | A * | 4/1952 | Burke | E06C 7/48 | 182/108 |
| 2,815,160 | A * | 12/1957 | Gilmour | E06C 1/345 | 182/214 |
| 2,934,163 | A * | 4/1960 | Ladewski | E06C 7/48 | 182/214 |
| 3,459,277 | A * | 8/1969 | Frederick | E06C 7/48 | 248/235 |
| 3,708,080 | A * | 1/1973 | Schlei | E06C 7/48 | D25/68 |
| 3,792,750 | A * | 2/1974 | Madison | E06C 7/185 | 182/206 |
| 4,121,692 | A * | 10/1978 | Morawski | E06C 7/16 | 182/129 |
| 4,179,011 | A * | 12/1979 | Morawski | E06C 1/345 | 182/206 |
| 4,306,632 | A * | 12/1981 | Brown | E06C 7/48 | 248/210 |
| 4,311,207 | A * | 1/1982 | Lurry | E06C 1/36 | 182/206 |
| 4,425,984 | A * | 1/1984 | Lachance | E06C 7/143 | 182/106 |

(Continued)

FOREIGN PATENT DOCUMENTS

| | | | | |
|---|---|---|---|---|
| GB | 2118236 | A * | 10/1983 | E06C 7/488 |

*Primary Examiner* — Brian D Mattei
*Assistant Examiner* — Kathleen M. McFarland
(74) *Attorney, Agent, or Firm* — ALBERT BORDAS, P.A.; Albert Bordas, Esq.

(57) ABSTRACT

An attachable ladder stability device having a first arm assembly, a first foot assembly, a second arm assembly, and a second foot assembly, which can mount onto a ladder assembly to stabilize the ladder assembly. The invention includes a tether assembly, a first telescopic assembly, and a second telescopic assembly. The ladder assembly has ladder rungs (that are hollow) and direct rung-to-rail connections at respective ends of the ladder rungs. The first arm assembly and second arm assembly insert into the ladder rungs. The invention interfaces with a roof having an upper surface and a side wall. The first and second foot assemblies pivot on the first and second arm assemblies, respectively, to interface with angles defined by the roof surface. If the roof assembly includes a gutter base and a gutter front wall, the first and second telescopic assemblies extend downward to the gutter front wall and gutter base.

17 Claims, 2 Drawing Sheets

(56) References Cited

U.S. PATENT DOCUMENTS 4,502,566 A * 3/1985 Wing ........................ E06C 7/48 182/214
4,531,613 A * 7/1985 Keigher .................. E06C 7/488 182/163
4,548,293 A * 10/1985 Haab ......................... E06C 9/02 182/99
4,723,632 A * 2/1988 Gedgoudas ............... E06C 7/48 182/206
4,787,478 A * 11/1988 Stakes, Jr. ............... E06C 1/345 182/206
4,924,971 A * 5/1990 Rice ........................ E06C 7/486 182/93
4,938,312 A * 7/1990 Trail ....................... E06C 7/488 182/209
4,949,810 A * 8/1990 Dwinnell ................ E06C 1/345 248/238
5,165,501 A * 11/1992 Donahey ................. E06C 7/423 182/214
5,249,397 A * 10/1993 Monaco .................. E04G 3/265 52/126.1
5,423,397 A * 6/1995 Boughner ................. E06C 7/44 182/172
5,624,006 A * 4/1997 Richardson, Jr. ......... E06C 7/16 248/237
5,931,259 A * 8/1999 Hoey ........................ E06C 7/48 248/210
5,960,905 A * 10/1999 Gardner .................. E06C 7/143 248/210
6,019,191 A * 2/2000 Flores ....................... E06C 7/48 182/214
6,053,284 A * 4/2000 Fountain ................... E06C 7/42 182/180.2
6,152,261 A * 11/2000 Hoey ........................ E06C 7/48 182/107
6,244,383 B1 * 6/2001 Jung ......................... E06C 7/16 182/214
6,328,130 B1 * 12/2001 Smith ..................... E06C 7/143 182/214
6,394,229 B1 * 5/2002 Hastreiter ............... E06C 1/345 248/210
6,527,084 B2 * 3/2003 Hrincu ...................... E06C 7/44 182/180.2
6,681,893 B1 * 1/2004 Coulson .................... E06C 7/48 182/214
8,235,175 B1 * 8/2012 Feldhaus ................... E06C 7/48 403/359.1
8,602,163 B2 * 12/2013 Davis, Jr. .................. E06C 7/48 182/106
8,684,137 B2 * 4/2014 Collister ................. E04G 5/041 248/237
8,839,906 B1 * 9/2014 Furr ........................ E06C 7/482 182/214
8,839,908 B2 * 9/2014 Davis, Jr. ................ E06C 7/182 182/106
10,883,310 B2 * 1/2021 Johnson .................... E06C 7/48
12,366,118 B1 * 7/2025 Parsons ..................... E06C 1/22
12,404,724 B2 * 9/2025 Johnson .................. E06C 7/188
2005/0023084 A1 * 2/2005 Lazarus .................. E06C 7/482 182/214
2007/0227819 A1 * 10/2007 Layfield .................... E06C 1/38 182/163
2007/0267251 A1 * 11/2007 Poldmaa ................... E06C 7/48 182/107
2008/0190692 A1 * 8/2008 Feik ........................ E06C 7/182 182/107
2009/0255759 A1 * 10/2009 Barnes ...................... E06C 7/48 182/204
2011/0067954 A1 * 3/2011 Deal ......................... E06C 7/48 182/172
2011/0174574 A1 * 7/2011 Collister ................. E04G 3/265 182/45
2012/0160607 A1 * 6/2012 Davis, Jr. ................ E06C 7/188 182/107
2012/0175188 A1 * 7/2012 Xu ............................ E06C 7/46 182/107
2014/0041965 A1 * 2/2014 Hess ......................... E06C 7/48 29/428
2016/0281427 A1 * 9/2016 Weatherall ................ E06C 7/42
2018/0016843 A1 * 1/2018 Milton ...................... E06C 7/48
2018/0266178 A1 * 9/2018 Sapp ......................... E06C 7/48
2018/0363373 A1 * 12/2018 Anderson ............... E06C 1/345
2020/0149348 A1 * 5/2020 Khwaja ..................... E06C 1/12
2020/0224495 A1 * 7/2020 Johnson .................. E06C 7/486
2020/0378186 A1 * 12/2020 Perreault ................... E06C 7/48
2021/0198947 A1 * 7/2021 Goudreault ............. E06C 7/423
2021/0207436 A1 * 7/2021 Taylor ....................... E06C 7/06
2021/0254407 A1 * 8/2021 Elmore ................... E06C 7/188
2021/0262289 A1 * 8/2021 Milton .................... E06C 7/488
2023/0203889 A1 * 6/2023 Johnson .................. E06C 7/486 182/21

* cited by examiner 10
30
40
58
38
36
34
32
32'
116
114
112
110
42
44
52
54
56
90
104
60
46
48
50
34'
36'
38'
58'
40'
30'
54'
44'
42'
52'
60'
46'
50'
48'
90'
104'

110
30
44
62
64
68
66
60
50
92
94
96
98
90
100
102

110
30'
68'
44'
60'
64'
62'
66'
92'
50'
94'
96'
98'
90'
100'
102'

ATTACHABLE LADDER STABILITY DEVICE

BACKGROUND OF THE INVENTION

1. Field of the Invention

The present invention relates to ladders, and more particularly, to ladder attachments that stabilize leaning ladders.

2. Description of the Related Art

Applicant is not aware of any attachable ladder stability device having the novel features of the present invention.

SUMMARY OF THE INVENTION

The invention consists of a first arm assembly, a first foot assembly, and a second arm assembly, and a second foot assembly. The device also includes a tether assembly, a first telescopic assembly, and a second telescopic assembly.

The first arm assembly includes a first arm upper bar and a first arm lower bar, while the second arm assembly includes a second arm upper bar and a second arm lower bar. Both arm assemblies can be mounted onto a ladder assembly, which includes ladder rails, ladder direct rung-to-rail connections, and ladder rungs. The ladder rungs are hollow and have the ladder direct rung-to-rail connections at respective ends.

The first arm assembly and the second arm assembly attach to the ladder assembly. A first ladder rung secures the first arm upper bar and the second arm upper bar, while a second ladder rung secures the first arm lower bar and the second arm lower bar. The first arm upper bar and the second arm upper bar are inserted into a first ladder direct rung-to-rail connection, and the first arm lower bar and the second arm lower bar are inserted into a second ladder direct rung-to-rail connection.

The tether assembly further secures the first arm assembly and the second arm assembly to the ladder assembly. The tether assembly includes a tether connection, a tether safety pin, and a tether tension arm, and connects the first arm assembly and the second arm assembly. The first arm assembly includes a first arm through hole, and the second arm assembly includes a second arm through hole to attach the tether assembly.

The first arm assembly and the second arm assembly can also mount onto a roof, which includes a roof upper surface and a roof side wall. The first foot assembly and the second foot assembly interface with the roof upper surface. Each foot assembly includes a foot pad and can pivot on its respective arm assembly to interface with angles defined by the roof upper surface.

The roof assembly includes a gutter base and a gutter front wall, which define a channel cavity, whereby, the first telescopic assembly and the second telescopic assembly are secured by the channel cavity. The first telescopic assembly and the second telescopic assembly each include a telescopic hollow post, telescopic through holes, and a telescopic adjustable support that allows them to adjust to lengths. The first telescopic assembly and the second telescopic assembly extend downward to the gutter front wall and the gutter base. They work in conjunction with the first foot assembly and the second foot assembly, to support in opposing directions to stabilize and prevent the ladder assembly from sliding backward or moving in longitudinal or horizontal directions.

It is therefore one of the main objects of the present invention to provide a stability device that stabilizes a ladder assembly.

It is another object of this invention to provide a stability device that secures to a ladder assembly.

It is another object of this invention to provide a stability device that can interface with variable structures and surfaces to provide stability for a ladder assembly.

It is another object of this invention to provide a stability device that is quick and easy to install.

It is another object of this invention to provide a stability device that is quick and easy to uninstall.

It is another object of this invention to provide a stability device that is volumetrically efficient for carrying, transporting, and storage.

It is another object of this invention to provide a stability device that can be readily assembled and disassembled without the need of any tools.

It is another object of this invention to provide a stability device which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figures 1, 2, 3:
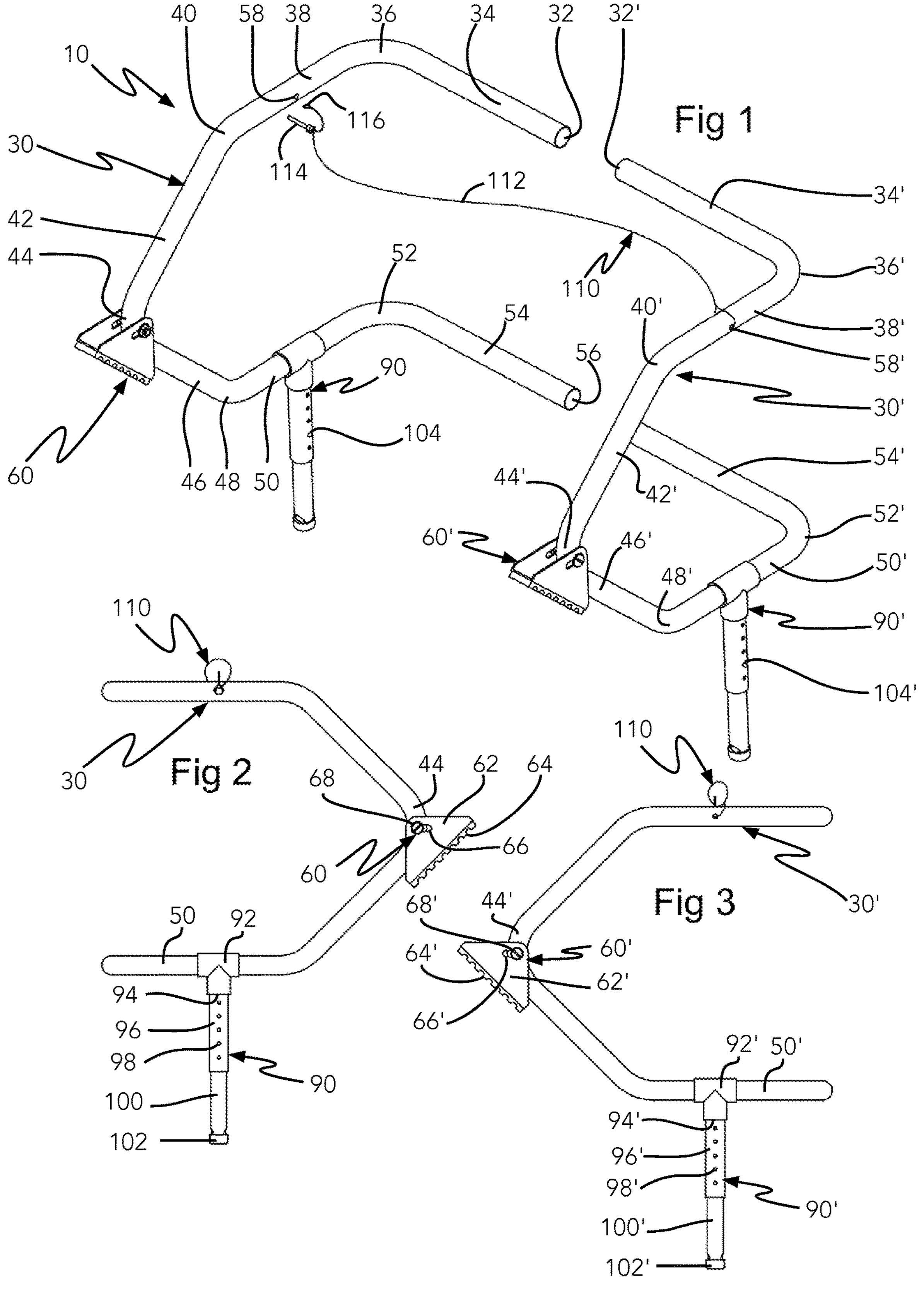
FIG. 1 represents an isometric view of the present invention.
FIG. 2 is a left-side view of a first arm assembly.
FIG. 3 is a right-side view of a second arm assembly.

Referring now to the drawings, the present invention is an attachable ladder stability device and is generally referred to with numeral 10. It can be observed that it basically includes first arm assembly 30, second arm assembly 30', first foot assembly 60, second foot assembly 60', first telescopic assembly 90, second telescopic assembly 90', and tether assembly 110.

As seen in FIG. 1, first arm assembly 30 comprises first arm upper end 32, first arm upper bar 34, first arm upper bar bend 36, first arm upper extension 38, first arm upper extension bend 40, first arm upper pad extension 42, first arm pad bend 44, first arm lower pad extension 46, first arm lower extension bend 48, first arm lower extension 50, first arm lower bar bend 52, first arm lower bar 54, first arm lower end 56, and first arm through hole 58.

Tether assembly 110 attaches to first arm through hole 58. First arm lower extension 50 and first arm upper extension 38 are parallel. First arm lower bar 54 and first arm upper bar

34 are also parallel. First foot assembly 60 is attached to first arm pad bend 44. First telescopic assembly 90 is attached to first arm lower extension 50.

Figure 4:
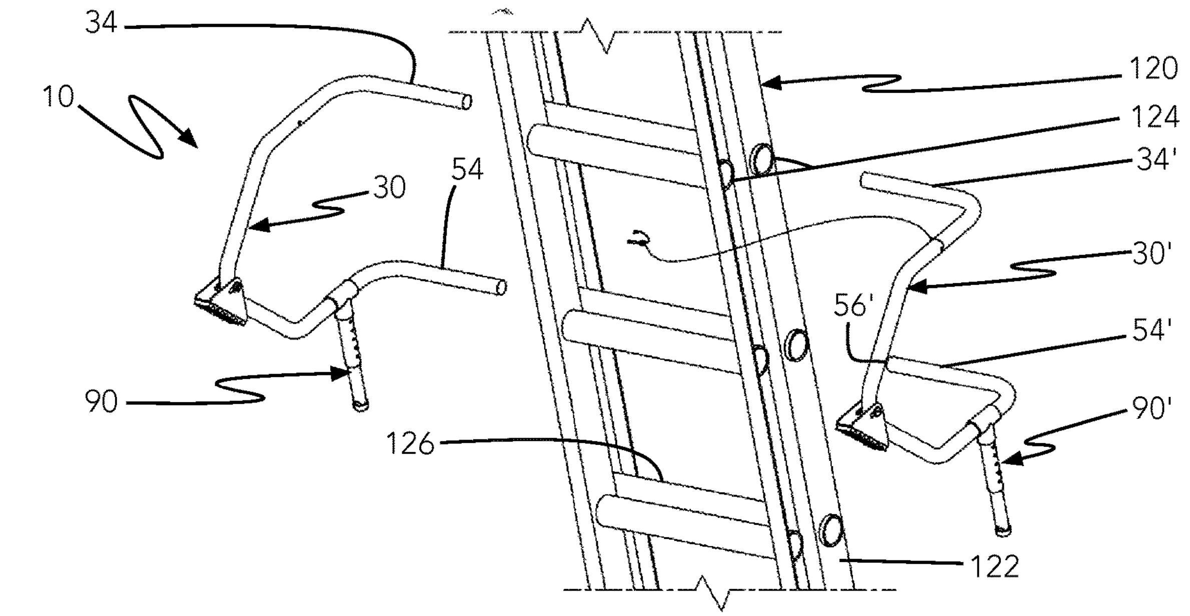
FIG. 4 is an isometric view of the present invention being mounted onto a ladder assembly.

Second arm assembly 30' comprises second arm upper end 32', second arm upper bar 34', second arm upper bar bend 36', second arm upper extension 38', second arm upper extension bend 40', second arm upper pad extension 42', second arm pad bend 44', second arm lower pad extension 46', second arm lower extension bend 48', second arm lower extension 50', second arm lower bar bend 52', second arm lower bar 54', second arm lower end 56' seen in FIG. 4, and second arm through hole 58'. Tether assembly 110 attaches to second arm through hole 58'. Second arm lower extension 50' and second arm upper extension 38' are parallel. Second arm lower bar 54' and second arm upper bar 34' are also parallel. Second foot assembly 60' is attached to second arm pad bend 44'. Second telescopic assembly 90' is attached to second arm lower extension 50'.

Tether assembly 110 comprises tether connection 112, tether safety pin 114, and tether tension arm 116. First arm assembly 30 and second arm assembly 30' are further secured to ladder assembly 120, seen in FIG. 4, by tether assembly 110. Tether assembly 110 connects first arm assembly 30 to second arm assembly 30' by attaching to first arm through hole 58 and second arm through hole 58'. Tether connection 112 extends from first arm assembly 30 to second arm assembly 30'.

As seen in FIGS. 2 and 3, first and second arm assemblies 30 and 30' are mirror images of each other. The bars that make up first and second arm assemblies 30 and 30' are symmetrical about first and second arm pad bends 44 and 44' respectively.

First foot assembly 60 comprises first foot structural surfaces 62, first foot pad 64, first foot through holes 66, and first foot fasteners 68. First foot fasteners 68 secure first foot assembly 60 to first arm assembly 30. First foot fasteners 68 allow first foot assembly 60 to pivot about first foot fasteners 68 with respect to first arm pad bend 44.

Second foot assembly 60' comprises second foot structural surfaces 62', second foot pad 64', second foot through holes 66', and second foot fasteners 68'. Second foot fasteners 68' secure second foot assembly 60' to second arm assembly 30'. Second foot fasteners 68' allow second foot assembly 60' to pivot about second foot fasteners 68' with respect to second arm pad bend 44'.

First telescopic assembly 90 extends perpendicularly downward from first arm lower extension 50. First telescopic assembly 90 comprises first telescopic T-support 92, first telescopic T-support end 94, first telescopic hollow post 96, first telescopic through holes 98, first telescopic adjustable support 100, and first telescopic end cap 102. First telescopic adjustable support 100 extends out of first telescopic hollow post 96 and is fixed at predetermined lengths.

Second telescopic assembly 90' extends perpendicularly downward from second arm lower extension 50'. Second telescopic assembly 90' comprises second telescopic T-support 92', second telescopic T-support end 94', second telescopic hollow post 96', second telescopic through holes 98', second telescopic adjustable support 100', and second telescopic end cap 102'. Second telescopic adjustable support 100' extends out of second telescopic hollow post 96' and is fixed at predetermined lengths.

Figure 5:
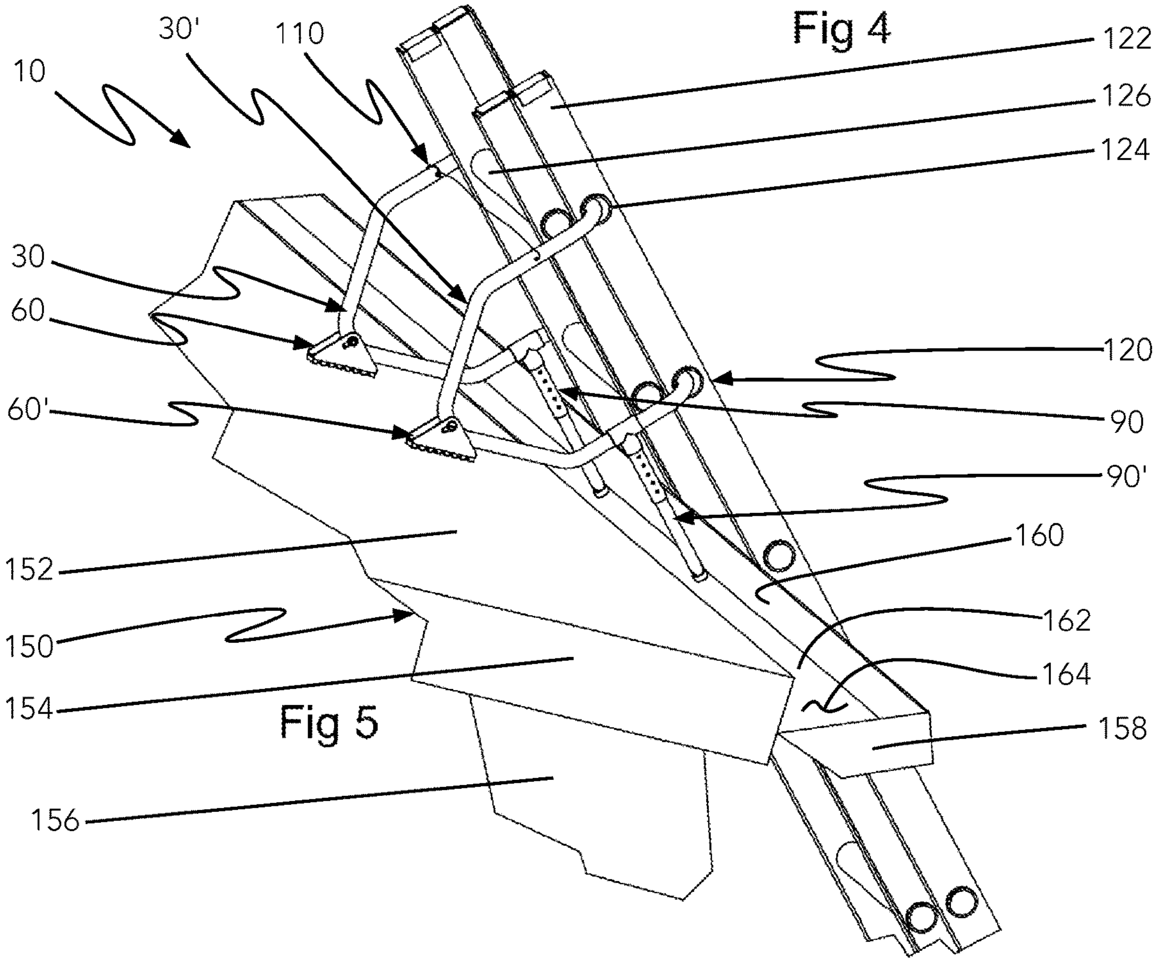
FIG. 5 is an isometric view of the present invention mounted onto a ladder assembly that is secured onto a roof assembly.

As seen in FIGS. 4 and 5, ladder assembly 120 comprises ladder rails 122, ladder direct rung-to-rail connections 124, and ladder rungs 126. Ladder rungs 126 are hollow and comprise ladder direct rung-to-rail connections 124 at respective ends. First arm assembly 30 and second arm assembly 30' attach to ladder assembly 120. First ladder rung 126 secures first arm upper bar 34 and second arm upper bar 34', and second ladder rung 126 secures first arm lower bar 54 and second arm lower bar 54', whereby first arm upper bar 34 and second arm upper bar 34' are inserted into first ladder direct rung-to-rail connections 124, and first arm lower bar 54 and second arm lower bar 54' are inserted into second ladder direct rung-to-rail connections 124. In a preferred embodiment, the first ladder direct rung-to-rail connections 124 and second ladder direct rung-to-rail connections 124 are adjacent to one another without any other ladder direct rung-to-rail connections in between them.

In one embodiment, roof assembly 150 comprises roof upper surface 152, roof side wall 154, and roof support wall 156. In use, first foot assembly 60 and second foot assembly 60' interface with roof upper surface 150, whereby first foot assembly 60 and second foot assembly 60' pivot to adjust to various roof upper surface 152 angles.

In another embodiment, roof assembly 150 may also comprise a gutter system having gutter side wall 158, gutter front wall 160, gutter base 162, and channel cavity 164. If roof assembly 150 also comprises the gutter system having gutter side wall 158, gutter front wall 160, and gutter base 162, first telescopic assembly 90 and second telescopic assembly 90' interface with gutter front wall 160 and gutter base 162. Gutter front wall 160 and gutter base 162 define channel cavity 164, whereby first telescopic assembly 90 and second telescopic assembly 90' are secured. First telescopic assembly 90 and second telescopic assembly 90' vary in length. First telescopic assembly 90 and second telescopic assembly 90' extend downward towards gutter front wall 160 and gutter base 162 and lock in place when first push button 104 and second push button 104' protrude from first through hole 98 and second through hole 98', respectively. First telescopic assembly 90 and second telescopic assembly 90', in conjunction with first foot assembly 60 and second foot assembly 60', support in opposing directions to prevent ladder assembly 120 from sliding backward or moving in longitudinal and lateral directions. First and second telescopic arm assemblies, 90 and 90', adjust in length to interface with various gutter sizes and designs.

In a preferred embodiment, first and second arm assemblies 30 and 30', respectively, are installed on an extension ladder. More specifically, first and second arm assemblies 30 and 30' are installed on the part of an extension ladder that extends.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An attachable ladder stability device, comprising:

A) a first arm assembly comprising a first arm upper bar, a first arm lower bar, a first arm upper extension, a first arm lower extension, and a first foot assembly wherein said first arm lower extension and said first arm upper extension are parallel to each other and said first arm lower bar and said first arm upper bar are parallel, said first foot assembly is attached to a first arm pad bend, said first foot assembly has a first foot pad;

B) a second arm assembly comprising a second arm upper bar, a second arm lower bar, a second arm lower extension, and a second arm upper extension, and a second foot assembly, whereby said second arm lower extension and said second arm upper extension are parallel and said second arm lower bar and said second arm upper bar are parallel, said second foot assembly is attached to a second arm pad bend, said second foot assembly has a second foot pad;

C) a tether assembly;

D) a first telescopic assembly; and

E) a second telescopic assembly, said first arm assembly and said second arm assembly mount onto a ladder assembly to be mounted onto a roof assembly having a roof upper surface and a roof side wall, said roof assembly further comprises a gutter base and a gutter front wall that define a channel cavity, whereby said first telescopic assembly and said second telescopic assembly are secured by said channel cavity, said ladder assembly comprises ladder rails, ladder direct rung-to-rail connections, and ladder rungs, said ladder rungs are hollow and comprise said ladder direct rung-to-rail connections at respective ends, said first arm assembly and said second arm assembly insert into said ladder rungs to secure to said ladder assembly.

2. The attachable ladder stability device set forth in claim 1, further characterized in that a first of said ladder rungs secures said first arm upper bar and said second arm upper bar, and a second of said ladder rungs secures said first arm lower bar and said second arm lower bar, whereby said first arm upper bar and said second arm upper bar are inserted into a first of said ladder direct rung-to-rail connections, and said first arm lower bar and said second arm lower bar are inserted into a second of said ladder direct rung-to-rail connections.

3. The attachable ladder stability device set forth in claim 1, further characterized in that said first arm assembly and said second arm assembly are further secured to said ladder assembly by said tether assembly.

4. The attachable ladder stability device set forth in claim 3, further characterized in that said tether assembly comprises a tether connection, a tether safety pin, and a tether tension arm.

5. The attachable ladder stability device set forth in claim 4, further characterized in that said tether assembly connects said first arm assembly and said second arm assembly.

6. The attachable ladder stability device set forth in claim 5, further characterized in that said first arm assembly comprises a first arm through hole and said second arm assembly comprises a second arm through hole to attach said tether assembly.

7. The attachable ladder stability device set forth in claim 1, further characterized in that said first foot assembly and said second foot assembly interface with said roof upper surface.

8. The attachable ladder stability device set forth in claim 7, further characterized in that said first foot assembly and said second foot assembly pivot on said first arm assembly and said second arm assembly, respectively, to interface with angles defined by said roof upper surface.

9. The attachable ladder stability device set forth in claim 1, further characterized in that said first telescopic assembly and said second telescopic assembly each comprise a telescopic hollow post, telescopic through holes, and a telescopic adjustable support that allow said first telescopic assembly and said second telescopic assembly to adjust to lengths.

10. The attachable ladder stability device set forth in claim 9, further characterized in that said first telescopic assembly and said second telescopic assembly extend downward to said gutter front wall and gutter base.

11. The attachable ladder stability device set forth in claim 10, further characterized in that said first telescopic assembly and said second telescopic assembly in conjunction with said first foot assembly and said second foot assembly support in opposing directions to stabilize said ladder assembly.

12. An attachable ladder stability device, comprising:

A) a first arm assembly comprising a first arm upper bar, a first arm upper extension, a first arm upper pad extension, a first arm pad bend, a first arm lower pad extension, a first arm lower extension, a first arm lower bar, and a first foot assembly attached to said first arm pad bend;

B) a second arm assembly comprising a second arm upper bar, a second arm upper extension, a second arm upper pad extension, a second arm pad bend, a second arm lower pad extension, a second arm lower extension, a second arm lower bar, and a second foot assembly attached to said second arm pad bend;

C) a tether assembly connecting said first arm assembly and said second arm assembly;

D) a first telescopic assembly attached to said first arm lower extension; and

E) a second telescopic assembly attached to said second arm lower extension.

13. The attachable ladder stability device set forth in claim 12, further characterized in that said first arm lower extension and said first arm upper extension are parallel to each other and said first arm lower bar and said first arm upper bar are parallel to each other.

14. The attachable ladder stability device set forth in claim 12, further characterized in that second arm lower extension and said second arm upper extension are parallel to each other and said second arm lower bar and said second arm upper bar are parallel to each other.

15. The attachable ladder stability device set forth in claim 12, further characterized in that said first arm assembly and said second arm assembly mount onto a ladder assembly comprising ladder rails, ladder direct rung-to-rail connections, and ladder rungs, said ladder rungs are hollow and comprise said ladder direct rung-to-rail connections at respective ends, whereby said first arm assembly and said second arm assembly insert into said ladder rungs to secure to said ladder assembly.

16. The attachable ladder stability device set forth in claim 12, further characterized in that said first foot assembly and said second foot assembly pivot on said first arm assembly and said second arm assembly, respectively, to interface with angles defined by a roof upper surface.

17. The attachable ladder stability device set forth in claim 12, further characterized in that said roof assembly further comprises a gutter base and a gutter front wall that define a channel cavity, whereby said first telescopic assembly and said second telescopic assembly are secured by said channel cavity, whereby said first telescopic assembly and said second telescopic assembly in conjunction with said first foot assembly and said second foot assembly support in opposing directions to stabilize said ladder assembly.

* * * * *